US010596467B2

(12) United States Patent
Desjardins et al.

(10) Patent No.: US 10,596,467 B2
(45) Date of Patent: Mar. 24, 2020

(54) SYSTEM AND METHOD FOR DETERMINING CURVED PATH OF TRAVEL FOR A CHARACTER IN COVER MODE IN A GAME ENVIRONMENT

(71) Applicant: SQUARE ENIX LTD, London (GB)

(72) Inventors: Joel Desjardins, Montreal (CA); Maxime Bellehumeur, Montreal (CA)

(73) Assignee: SQUARE ENIX LIMITED, London (GB)

( * ) Notice: Subject to any disclaimer, the term of this patent is extended or adjusted under 35 U.S.C. 154(b) by 251 days.

(21) Appl. No.: 15/617,872

(22) Filed: Jun. 8, 2017

(65) Prior Publication Data

US 2018/0001201 A1   Jan. 4, 2018

Related U.S. Application Data

(60) Provisional application No. 62/348,367, filed on Jun. 10, 2016.

(30) Foreign Application Priority Data

May 26, 2017   (CA) ..................... 2968587

(51) Int. Cl.
*A63F 13/56* (2014.01)
*A63F 13/573* (2014.01)
*A63F 13/837* (2014.01)

(52) U.S. Cl.
CPC ............ *A63F 13/56* (2014.09); *A63F 13/573* (2014.09); *A63F 13/837* (2014.09)

(58) Field of Classification Search
CPC ...... A63F 13/56; A63F 13/573; A63F 13/837; A63F 2300/207; A63F 2300/6607; A63F 2300/6623
See application file for complete search history.

(56) References Cited

U.S. PATENT DOCUMENTS

2009/0311652 A1* 12/2009 Langridge ............... G09B 19/00
                                                              434/11
2010/0009734 A1*  1/2010 Sambongi ............... A63F 13/10
                                                              463/5

FOREIGN PATENT DOCUMENTS

EP            2371433 A2    10/2011

OTHER PUBLICATIONS

Salomon, B. et al., "Interactive Navigation in Complex Environments Using Path Planning", Proceedings Symposium on Interactive 3D Graphics, New York, NY, US, Apr. 27, 2003, pp. 41-50, XP058235660. (Year: 2003).*

(Continued)

*Primary Examiner* — Jasson H Yoo

(74) *Attorney, Agent, or Firm* — Duane Morris LLP

(57) ABSTRACT

A computer system comprising a memory storing data and program instructions, the data representing a game environment including a character and a plurality of cover segments; a player interface; and a processor configured to execute the program instructions stored in the memory. Execution of the program instructions causes the computer to implement a method that comprises determining a selected subset of the cover segments; determining a curved path that passes through control points associated with the selected subset of the cover segments; and rendering images for display via the player interface, the images showing movement of the character along the curved path while the character is in cover mode.

36 Claims, 11 Drawing Sheets

(56) References Cited

OTHER PUBLICATIONS

Extended European Search Report dated May 8, 2018, in corresponding European Patent Application No. 17174412.1.
Partial European Search Report (R. 64 EPC) issued by the European Patent Office on Jan. 31, 2018, in corresponding EP Patent Application No. 17174412.1.
"Cover System (Concept)—Giant Bomb", Anonymous, Aug. 28, 2014, XP055441803, Retrieved from the Internet: URL:https://www.giantbomb.com/cover-system/3015/55/, [retrieved on Jan. 28, 2017], pp. 1,2.
Salomon, B. et al., "Interactive Navigation in Complex Environments Using Path Planning", Proceedings Symposium on Interactive 3D Graphics, New York, NY, US, Apr. 27, 2003, pp. 41-50, XP058235660.

* cited by examiner

| Character | Mode |
|---|---|
| Avatar1 | Normal |
| Avatar2 | Cover |
| Avatar3 | Normal |

Fig. 8

| Character | Objects in the vicinity of character |
|---|---|
| Avatar1 | Car 1 |
| Avatar2 | Car 2, Flower pot |
| Avatar3 | Building1, Car 3 |

Fig. 9

| Object | Cover segment(s) |
|---|---|
| Car 1 | XY |
| Car 2 | AB, CD, ..., EF |
| Car 3 | LM, NP, ..., PL (closed surface) |
| Flower pot | --- |
| Sofa 2 | RS |
| Building 1 | GH |
| Building 2 | UV |
| Building 3 | JK |

Fig. 10

| Character | Mode | Final cover path |
|---|---|---|
| Avatar 1 | Normal | {parameter set 1} |
| Avatar 2 | Cover | {parameter set 2} |
| Avatar 3 | Normal | {parameter set 3} |

Fig. 11

SYSTEM AND METHOD FOR DETERMINING CURVED PATH OF TRAVEL FOR A CHARACTER IN COVER MODE IN A GAME ENVIRONMENT

CROSS-REFERENCE TO RELATED APPLICATION

The present application claims the benefit of U.S. Provisional Patent Application Ser. No. 62/348,367 entitled "SYSTEM AND METHOD FOR DETERMINING CURVED PATH OF TRAVEL FOR A CHARACTER IN COVER MODE IN A GAME ENVIRONMENT", filed on Jun. 10, 2016, and Canadian Application No. 2968587, filed May 26, 2017, entitled SYSTEM AND METHOD FOR DETERMINING CURVED PATH OF TRAVEL FOR A CHARACTER IN COVER MODE IN A GAME ENVIRONMENT, both of which are hereby incorporated by reference herein.

FIELD

The present application relates generally to video games that feature cover mode and, in particular, to determining a curved path of travel for a character in cover mode.

BACKGROUND

In many action games, characters (such as the main character and non-playing characters—NPCs) may enter "cover mode" in which they "take cover" along movable or immovable objects such as walls. This is a special navigation mode during which the character is protected from its opponents while its movement is constrained to follow a cover line that is predefined for each object. As such, when the character moves from object to object in the game while in cover mode, the system renders the character's trajectory, which follows a sequence of straight line movements. Unfortunately, this produces an unnatural, jagged visual effect, which may lead to an undesirable gaming experience.

SUMMARY

A first broad aspect of the present invention seeks to provide a computer system, comprising: a memory storing data and program instructions, the data representing a game environment including a character and a plurality of cover segments; a player interface; and a processor configured to execute the program instructions stored in the memory. Execution of the program instructions causes the computer to implement a method that comprises determining a selected subset of the cover segments; determining a curved path that passes through control points associated with the selected subset of the cover segments; and rendering images for display via the player interface, the images showing movement of the character along the curved path while the character is in cover mode.

A second broad aspect of the present invention seeks to provide a method for controlling movement of a character within a game environment instantiated by a game program executed by a processing device of a game apparatus, the game environment including objects and cover segments associated with the objects. According to the method, the processing device determines a selected subset of the cover segments; determines a curved path that passes through control points associated with the selected subset of the cover segments; and renders images for display via the player interface, the images showing movement of the character along the curved path while the character is in cover mode.

A third broad aspect of the present invention seeks to provide a computer-readable medium comprising computer-readable instructions which, when executed by a processor of a game apparatus, cause the game apparatus to implement a method for controlling movement of a character within a game environment, the game environment including objects and cover segments associated with the objects. The method comprises determining a selected subset of the cover segments; determining a curved path that passes through control points associated with the selected subset of the cover segments; and rendering images for display via the player interface, the images showing movement of the character along the curved path while the character is in cover mode.

A fourth broad aspect of the present invention seeks to provide a method for controlling movement of a character within a game environment instantiated by a game program executed by a processing device of a game apparatus. According to this method, the processing device determines that the character is in cover mode; responsive to determining that the character is in cover mode, consults a memory to identify a curved cover path for the character, the cover path including at least one curved portion; and constrains movement of the character along the curved cover path while the character is in cover mode.

A fifth broad aspect of the present invention seeks to provide a computer-readable medium comprising computer-readable instructions which, when executed by a processor of a game apparatus, cause the game apparatus to implement a method for controlling movement of a character within a game environment. The method comprises determining that the character is in cover mode; responsive to determining that the character is in cover mode, consulting a memory to identify a curved cover path for the character, the curved cover path including at least one curved portion; and constraining movement of the character along the curved cover path while the character is in cover mode.

A sixth broad aspect of the present invention seeks to provide a computer system, comprising a memory storing data and program instructions, the data representing a game environment including a character; a player interface; and a processor configured to execute the program instructions stored in the memory. Execution of the program instructions causes the computer to implement a method that comprises determining that the character is in cover mode; responsive to determining that the character is in cover mode, consulting a memory to identify a cover path for the character, the curved cover path including at least one curved portion; and constraining movement of the character along the curved cover path while the character is in cover mode.

A seventh broad aspect of the present invention seeks to provide a method for controlling movement of a character within a game environment instantiated by a game program executed by a processing device of a game apparatus. According to this method, the processing device identifies an object in a vicinity of the character; determines a set of cover segments associated with the object; allows the character to travel along a user-defined trajectory within a navigation mesh when the character is not in cover mode; and constrains the character's motion to a cover path when the character is in cover mode and in a vicinity of the object, the cover segments being linear and the cover path being curved.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 8 illustrates a non-limiting example of an association stored in memory between characters and mode of operation of each character;

FIG. 9 illustrates a non-limiting example of an association stored in memory between characters and objects in a vicinity of each character;

FIG. 10 illustrates a non-limiting example of an association stored in memory between objects and cover segment(s);

FIG. 11 is an extension of FIG. 8 in which a further association is shown between characters and parameters of a final cover path for each character, according to a non-limiting embodiment;

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
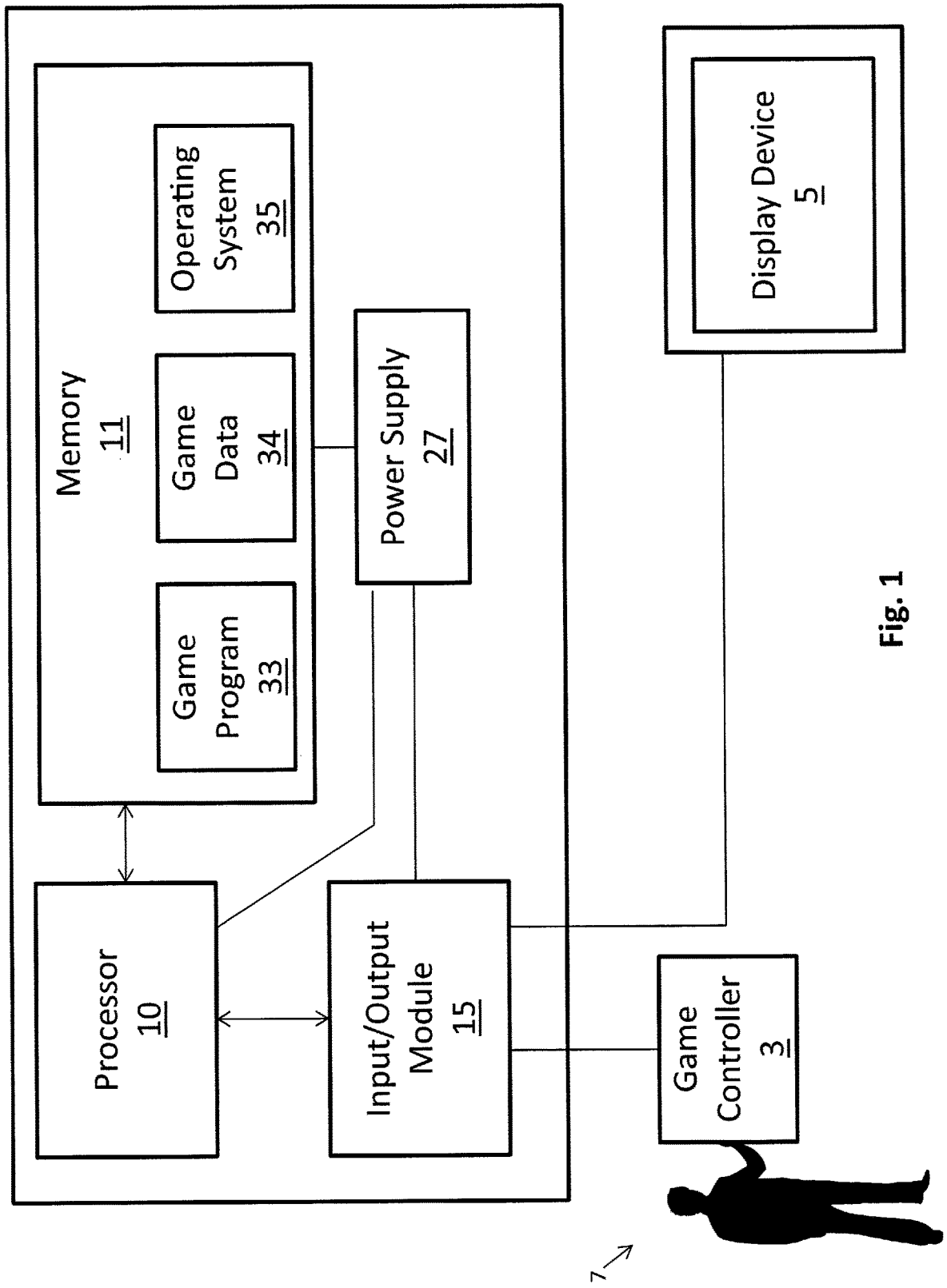
FIG. 1 is a block diagram illustrating a configuration of a game apparatus implementing an example non-limiting embodiment of the present invention.

FIG. 1 is a block diagram illustrating a configuration of a game apparatus 1 implementing an example non-limiting embodiment of the present invention. In some cases, the game apparatus 1 is a dedicated gaming console similar to an Xbox™, Playstation™, or Nintendo™ gaming console. In other cases, the game apparatus 1 is a multi-purpose workstation or laptop computer. In still other cases, the game apparatus 1 is a mobile device such as a smartphone. In yet other cases, the game apparatus 1 is a handheld game console.

The game apparatus 1 includes at least one processor 10, at least one computer readable memory 11, at least one input/output module 15 and at least one power supply unit 27, and may include any other suitable components typically found in a game apparatus used for playing video games. The various components of the game apparatus 1 may communicate with each other over one or more buses, which can be data buses, control buses, power buses and the like.

As shown in FIG. 1, a player 7 is playing a game by viewing game images displayed on a screen of a display device 5 and controlling aspects of the game via a game controller 3. Accordingly, the game apparatus 1 receives inputs from the game controller 3 via the input/output module 15. The game apparatus 1 also supplies outputs to the display device 5 and/or an auditory device (e.g., a speaker, not shown) via the input/output module 15. In other implementations, there may be more than one game controller 3 and/or more than one display device 5 connected to the input/output module 15.

The processor 10 may include one or more central processing units (CPUs) having one or more cores. The processor 10 may also include at least one graphics processing unit (GPU) in communication with a video encoder/video codec (coder/decoder, not shown) for causing output data to be supplied to the input/output module 15 for display on the display device 5. The processor 10 may also include at least one audio processing unit in communication with an audio encoder/audio codec (coder/decoder, not shown) for causing output data to be supplied to the input/output module 15 to the auditory device.

The computer readable memory 11 may include RAM (random access memory), ROM (read only memory), flash memory, hard disk drive(s), DVD/CD/Blu-Ray™ drive and/or any other suitable memory device, technology or configuration. The computer readable memory 11 stores a variety of information including a game program 33, game data 34 and an operating system 35.

When the game apparatus 1 is powered on, the processor 10 is configured to run a booting process which includes causing the processor 10 to communicate with the computer readable memory 11. In particular, the booting process causes execution of the operating system 35. The operating system 35 may be any commercial or proprietary operating system suitable for a game apparatus. Execution of the operating system 35 causes the processor 10 to generate images displayed on the display device 5, including various options that are selectable by the player 7 via the game controller 3, including the option for the player 7 to start and/or select a video game to be played. The video game selected/started by the player 7 is encoded by the game program 33.

The processor 10 is configured to execute the game program 33 such that the processor 10 is able to perform various kinds of information processing functions related to the video game that it encodes. In particular, and with reference to FIG. 2, execution of the game program 33 causes the processor to execute a game data processing function 22 and game rendering processing function 24, which are now described.

Figure 2:
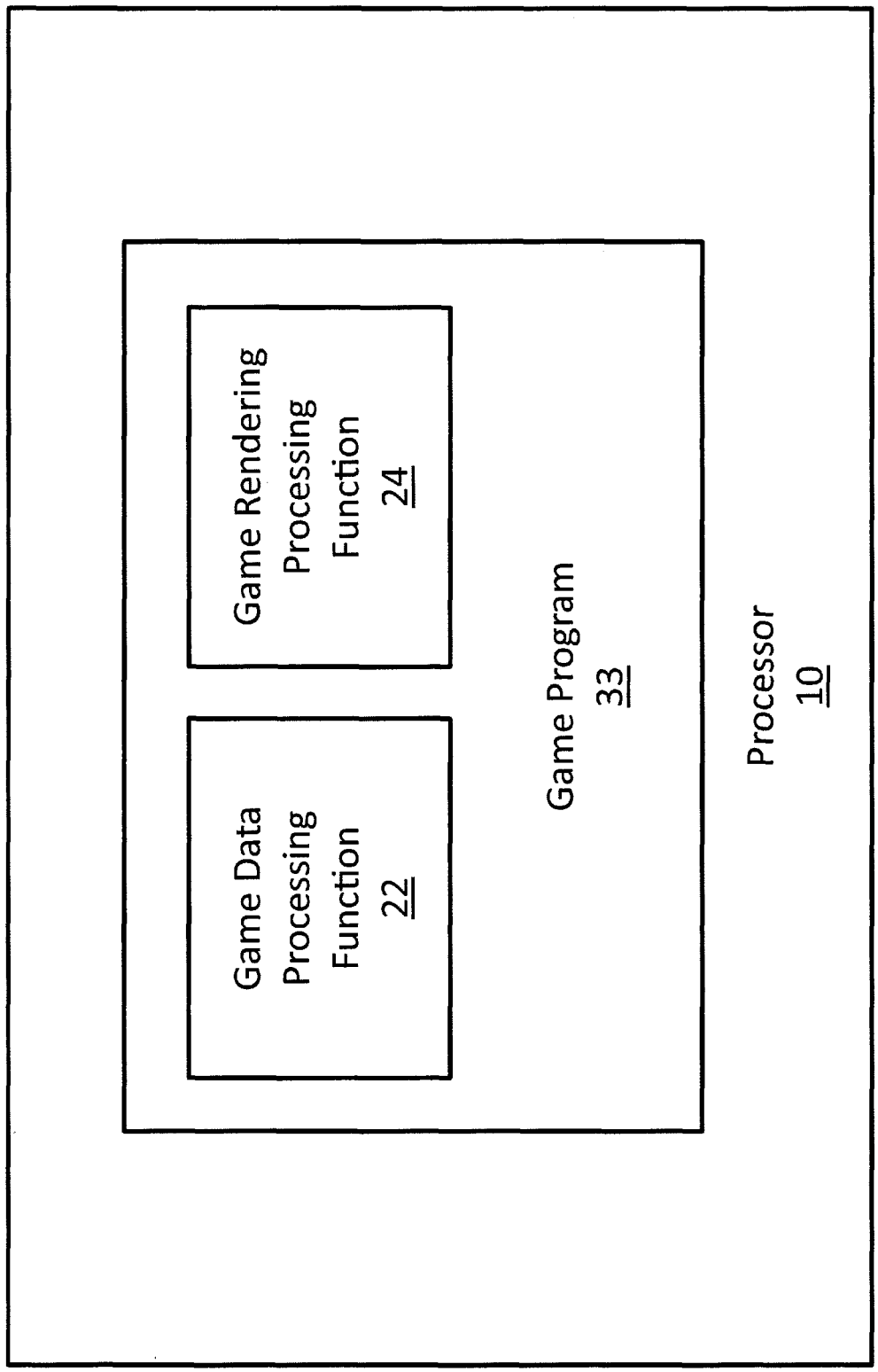
FIG. 2 shows components of a game program executed by the game apparatus of FIG. 1, including a game data processing function and a game rendering processing function.

The game rendering processing function 24 includes generation of a game image to be displayed on the display device 5. For its part, the game data processing function 22 includes processing of information representing progress of the game or a current state of the game (e.g., processing of information relating to the game that is not necessarily displayed on the display device 5). The game data processing function 22 and the game rendering processing function 24 are illustrated in FIG. 2 as forming part of a single game program 33. However, in other embodiments, the game data processing function 22 and the game rendering processing function 24 may be separate programs stored in separate memories and executed by separate, possibly distant, processors. For example, the game data processing function 22 may be performed on a CPU and the game rendering processing function 24 may be performed on a GPU.

Figure 3:
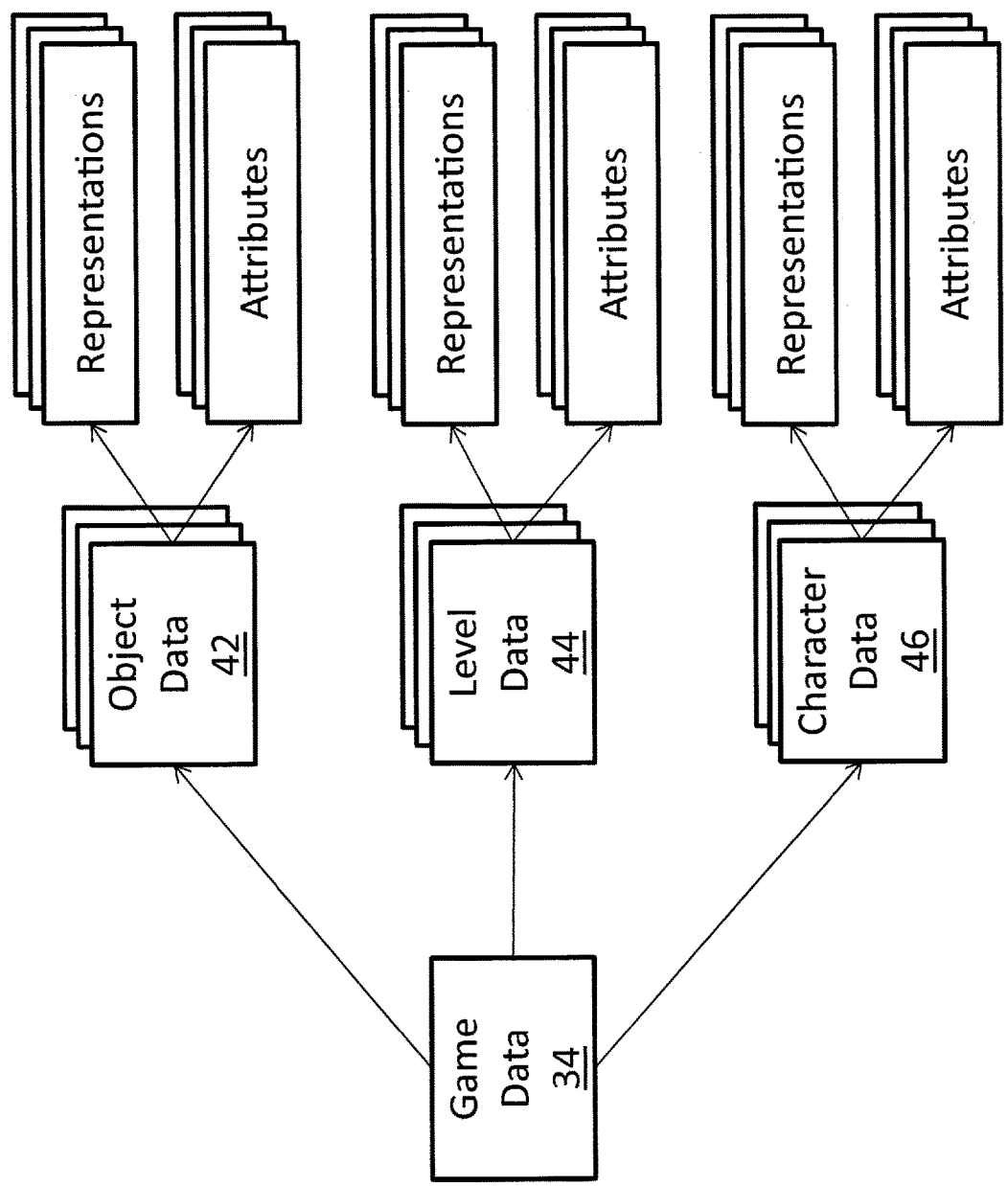
FIG. 3 shows examples of game data according to a present example embodiment.

In the course of executing the game program 33, the processor 10 manipulates constructs such as objects, characters and/or levels according to certain game rules and applying certain artificial intelligence algorithms. In the course of executing the game program 33, the processor 10 creates, loads, stores, reads and generally accesses the game data 34, which includes data related to the object(s), character(s) and/or level(s). FIG. 3 shows an example illustrating examples of game data 34 according to a present example embodiment. The game data 34 may include data related to the aforementioned constructs and therefore may include object data 42, level data 44 and/or character data 46.

An object may refer to any element or portion of an element in the game environment that can be displayed graphically in a game image frame. An object may include 3-dimensional representations of buildings, vehicles, furniture, plants, sky, ground, ocean, sun, and/or any other suitable elements. The object may have other non-graphical representations such numeric, geometric or mathematical representations. The object data 42 stores data relating to the current representation of the object such as the graphical representation in a game image frame or a numeric, geometric or mathematical representation. The object data 42 may also store attributes such as imaging data, position data, material/texture data, physical state data, visibility data, lighting data (e.g., direction, position, color and/or intensity), sound data, motion data, collision data, environment data, timer data and/or other data associated with the object. Certain attributes of an object may be controlled by the game program 33.

A character is similar to an object except that the attributes are more dynamic in nature and it has additional attributes that objects typically do not have. Certain attributes of a playing character may be controlled by the player 7. Certain attributes of a character, be it a playing character or a non-playing character, may be controlled by the game program 33. Examples of characters include a person, an avatar or an animal, to name a few non-limiting possibilities. The character may have other non-visual representations such as numeric, geometric or mathematical representations. A character may be associated with one or more objects such as a weapons held by a character or clothes donned by the character. The character data 46 stores data relating to the current representation of the character such as the graphical representation in a game image frame or a numeric, geometric or mathematical representation. The character data 46 may also store attributes such as imaging data, position data, material/texture data, physical state data, visibility data, lighting data (e.g., direction, position, color and/or intensity), sound data, motion data, collision data, environment data, timer data and/or other data associated with the character.

The game data 34 may also include data relating to the current view or camera angle of the game (e.g., first-person view, third-person view, etc.) as displayed on the display device 5 which may be part of the representations and/or attributes of the object data 42, level data 44 and/or character data 46.

In executing the game program 33, the processor 10 may cause an initialization phase to occur after the player 7 has selected/started the game, causing initialization of the game. The initialization phase is used to carry out any necessary game setup and prepare the game data 34 for the start of the game. The game data 34 changes during the processing of the game program 33 (i.e., during the playing of the game) and the terminology "game state" is used herein to define the current state or properties of the game data 34 and hence the various object data 42, level data 44 and/or character data 46 and their corresponding representations and/or attributes.

After the initialization phase, the processor 10 in execution of the game program 33 may implement one or more game loops. The one or more game loops run continuously during gameplay causing the game data processing function 22 and the game rendering processing function 24 to be routinely performed.

A game loop may be implemented, whereby (i) the game data processing function 22 is performed to process the player's input via the game controller 3 and to update the game state and afterwards (ii) the game rendering processing function 24 is performed to cause the game image to be rendered based on the updated game state for display on the display device 5. The game loop may also track the passage of time to control the rate of gameplay. It should be appreciated that parameters other than player inputs can influence the game state. For example, various timers (e.g., elapsed time, time since a particular event, virtual time of day, etc.) can have an effect on the game state. In other words, the game keeps moving even when the player 7 isn't providing input and as such, the game state may be updated in the absence of the player's input.

In general, the number of times the game data processing function 22 is performed per second specifies the updates to the game state per second (hereinafter "updates per second") and the number of times the game rendering processing function 24 is performed per second specifies game image rendering per second (hereinafter "frames per second"). In theory the game data processing function 22 and the game rendering processing function 24 would be called the same number of times per second. By way of a specific and non-limiting example, if the target is 25 frames per second, it would be desirable to have the game data processing function 22 and the game rendering processing function 24 both being performed every 40 ms (i.e., 1 s/25 FPS). In the case where the game data processing function 22 is performed and afterwards the game rendering processing function 24 is performed, it should be appreciated that both the game data processing function 22 and the game rendering processing function 24 would need to be performed in the 40 ms time window. Depending on the current game state, it should be appreciated that the time of performing the game data processing function 22 and/or the game rendering processing function 24 may vary. If both the game data processing function 22 and the game rendering processing function 24 take less than 40 ms to perform, a sleep timer may be used before performing the next cycle of the game data processing function 22 and the game rendering processing function 24. However, if the game data processing function 22 and the game rendering processing function 24 take more than 40 ms to perform for a given cycle, one technique is to skip displaying of a game image to achieve a constant game speed.

It should be appreciated that the target frames per second may be more or less than 25 frames per second (e.g., 60 frames per second); however, it may be desired that the game data processing function 22 and the game rendering processing function 24 be performed not less than 20 to 25 times per second so that the human eye won't notice any lag in the rendering of the game image frames. Naturally, the higher the frame rate, the less time between images and the more powerful the processor(s) require to execute the game loop, hence the reliance on specialized processor such as GPUs.

In other embodiments, the game data processing function 22 and the game rendering processing function 24 may be separate game loops and hence independent processes. In such cases, the game data processing function 22 may be routinely performed at a specific rate (i.e., a specific number of updates per second) regardless of when the game rendering processing function 24 is performed and the game rendering processing function 24 may be routinely performed at a specific rate (i.e., a specific number of frames per second) regardless of when the game data processing function 22.

It should be appreciated that the process of routinely performing, the game data processing function 22 and the game rendering processing function 24 may be implemented according to various techniques within the purview of the person skilled in the art and the techniques described in this document are non-limiting examples of how the game data processing function 22 and the game rendering processing function 24 may be performed.

When the game data processing function 22 is performed, the player input via the game controller 3 (if any) and the game data 34 is processed. More specifically, as the player 7 plays the video game, the player 7 inputs various commands via the game controller 3 such as move left, move right, jump, shoot, to name a few examples. In response to the player input, the game data processing function 22 may update the game data 34. In other words, the object data 42, level data 44 and/or character data 46 may be updated in response to player input via the game controller 3. It should be appreciated that every time the game data processing function 22 is performed, there may not be any player input via the game controller 3. Regardless of whether player input is received, the game data 34 is processed and may be updated. Such updating of the game data 34 may be in response to representations and/or attributes of the object data 42, level data 44 and/or character data 46 as the representations and/or attributes may specify updates to the game data 34. For example, timer data may specify one or more timers (e.g., elapsed time, time since a particular event, virtual time of day, etc.), which may cause the game data 34 (e.g., the object data 42, level data 44 and/or character data 46) to be updated. By way of another example, objects not controlled by the player 7 may collide (bounce off, merge, shatter, etc.), which may cause the game data 34 e.g., the object data 42, level data 44 and/or character data 46 to be updated in response to a collision.

Figure 4:
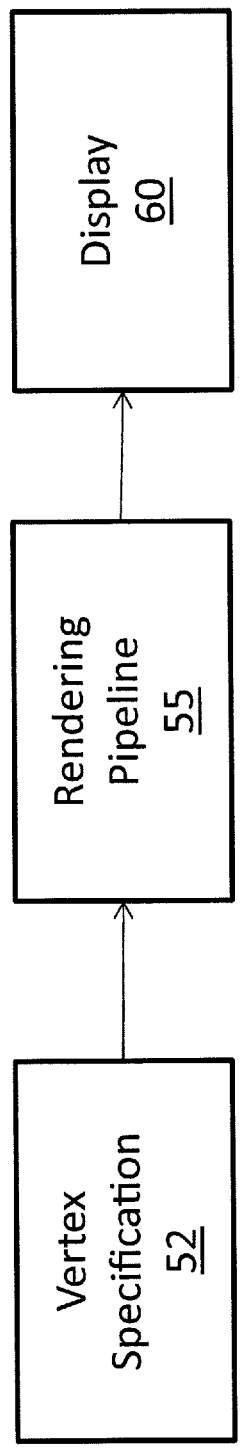
FIG. 4 illustrates an example of a process of converting a 3D graphics scene to a game image for display on a display device.

In general the game data 34 (e.g., the representations and/or attributes of the objects, levels, and/or characters) represents data that specifies a three-dimensional (3D) graphics scene of the game. The process of converting a three-dimensional (3D) graphics scene, which may include one or more 3D graphics objects, into two-dimensional (2D) rasterized game image for display on the display device 5 is generally referred to as rendering. FIG. 4 illustrates an example of a process of converting a 3D graphics scene to a game image for display on the display device 5 via the screen. At step 52, the game data processing function 22 processes the data that represents the three-dimensional (3D) graphics scene of the game and converts this data into a set of vertex data (also known as a vertex specification). The vertex data is suitable for processing by a rendering pipeline (also known as a graphics pipeline). At step 55, the game rendering processing function 24 processes the vertex data according to the rendering pipeline. The output of the rendering pipeline is typically pixels for display on the display device 5 via the screen (step 60).

More specifically, at step 52, the 3D graphics objects in the graphics scene may be subdivided into one or more 3D graphics primitives. A primitive may refer to a group of one or more vertices that are grouped together and/or connected to define a geometric entity (e.g., point, line, polygon, surface, object, patch, etc.) for rendering. For each of the 3D graphics primitives, vertex data is generated at this step. The vertex data of each primitive may include one or more attributes (e.g., position, the color, normal or texture coordinate information, etc.). In deriving the vertex data, a camera transformation (e.g., rotational transformations) may occur to transform the 3D graphics objects in the 3D graphics scene to the current view or camera angle. Also, in deriving the vertex data, light source data (e.g., direction, position, color and/or intensity) may be taken into consideration. The vertex data derived at this step is typically an ordered list of vertices to be sent to the rendering pipeline. The format of the ordered list typically depends on the specific implementation of the rendering pipeline.

At step 55, the game rendering processing function 24 processes the vertex data according to the rendering pipeline. Rendering pipelines are known in the art (e.g., OpenGL, DirectX, etc.); regardless of the specific rendering pipeline used to implement the rendering pipeline, the general process of the rendering pipeline is to create a 2D raster representation (e.g., pixels) of a 3D scene. The rendering pipeline in general calculates the projected position of the vertex data in to two-dimensional (2D) screen space and performs various processing which may take into consideration lighting, colour, position information, texture coordinates and/or any other suitable process to derive the game image (e.g., pixels) for output on the display device 5 (step 60).

In some cases, the game apparatus 1 is distributed between a server on the Internet and one or more Internet appliances. Plural players may therefore participate in the same online game, and the functionality of the game program (the game rendering processing function and/or the game data processing function) may be executed at least in part by the server.

Figure 6:
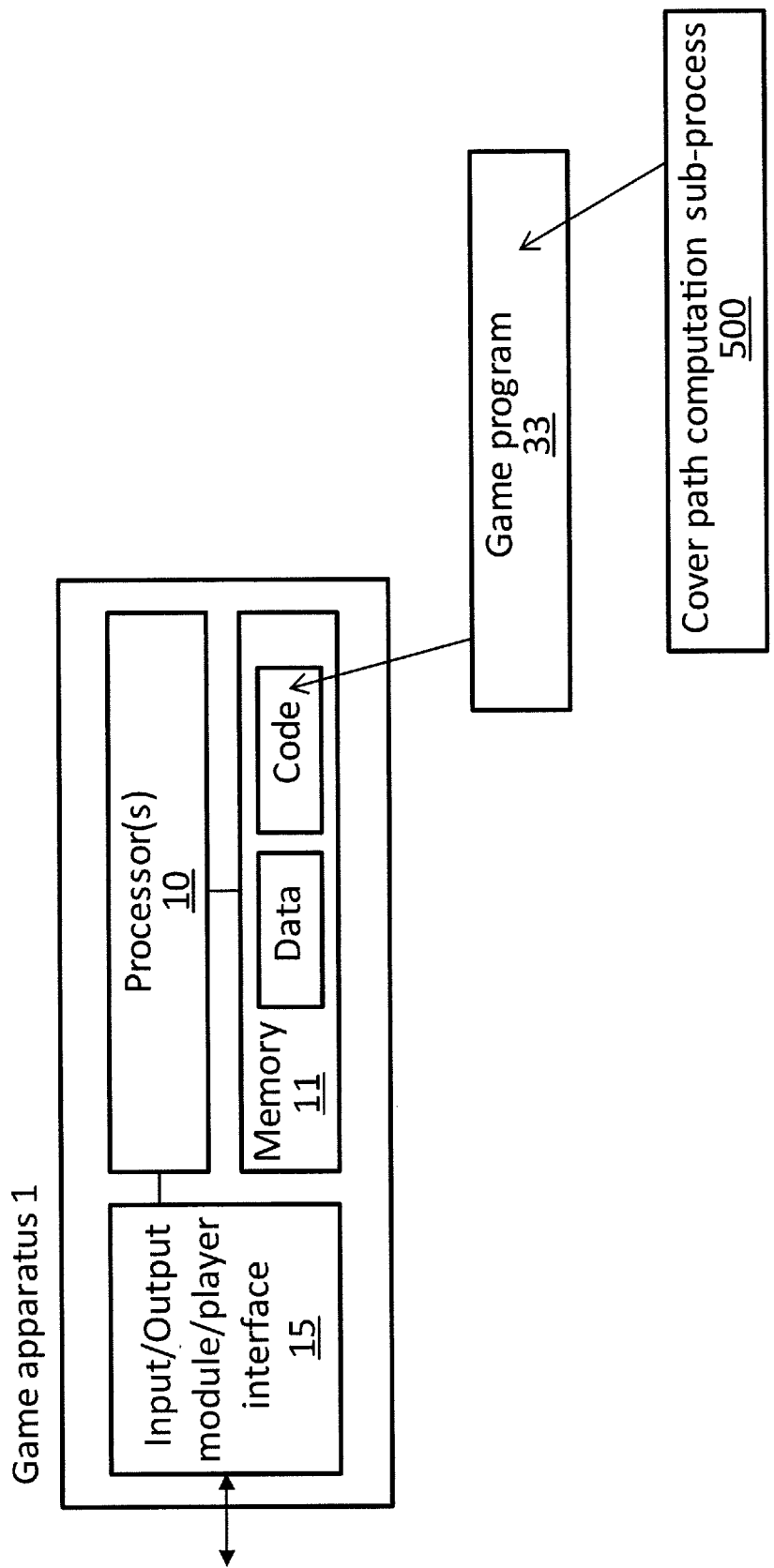
FIG. 6 is a block diagram of a game apparatus, schematically illustrating the game program and the cover path computation sub-process, according to a non-limiting embodiment.

With reference to FIG. 6, it is noted that the game apparatus 1 may be a computer system (such as a gaming console or PC) and the input/output module 15 may implement a player interface for interacting with the player 7 via the game controller 3 and the display device 5. The computer readable memory 11 stores game data 34 and program instructions (code). The processor 10 executes the program instructions stored in the computer readable memory 11, including the operating system 35 and the game program 33. In executing the game program 33, the processor 10 maintains a (simulated) game environment with objects, characters and levels. The characters include a main "playing" character (controlled by the player 7) and, if appropriate, one or more non-playing characters (NPCs).

In executing the game program 33, the processor 10 detects and/or monitors and/or controls movement of characters in the game environment and also whether a given character is in so-called "cover mode". For a playing character controlled by the player 7, cover mode can be entered explicitly by the player 7 or automatically by virtue of the character finding itself close enough to an object to "take cover" (and thus protect itself from enemy fire or other hostilities). In the case of a playing or non-playing character, the game program 33 may include artificial intelligence routines or sub-programs whose execution by the processor 10 allow the processor 10 to make decisions about when to place the NPC in cover mode.

An indication of whether a given character has entered cover mode may be stored in the computer readable memory 11, as shown in FIG. 8, from which it is seen that a character named Avatar 2 is in cover mode and characters named Avatar 1 and Avatar 3 are not, and they remain in normal mode. The "normal" mode is used to refer to the mode of a character that is not in cover mode, but it should be appreciated that there may be other modes besides "normal" and "cover". For the purposes of the present description, it is not material whether character is playing or non-playing.

When a given character is prompted to move in a certain direction (e.g., based on player input or other factors), the resulting change in the position of the character will depend on whether the character is in cover mode or not. If the character is indeed in cover mode, the character's movements will be constrained to follow a "cover path". To this end, in executing the game program 33, the processor 10 looks up the cover path in the memory 11 and, while the character is in cover mode, causes the position of the character to remain along the cover path. If the character is not in cover mode, the character's movements/direction of travel may be less constrained. As shown in FIG. 11, parameter sets defining a cover path (e.g., a parametric definition of the cover path) may be stored in the memory 11 in association with the characters that are in cover mode (in this case, Avatar 2) and potentially also in association with the characters that are not in cover mode (in this case, Avatar 1 and Avatar 3).

Embodiments of the present invention may be concerned with calculating, when appropriate, a cover path that may smoothly change directions along a curve, rather than being made up exclusively of a series of straight lines. Computation of the curved cover path can occur as part of a cover path computation sub-process 500 of the game program 33, as shown in FIG. 6 and further detailed in FIG. 5.

Figure 5:
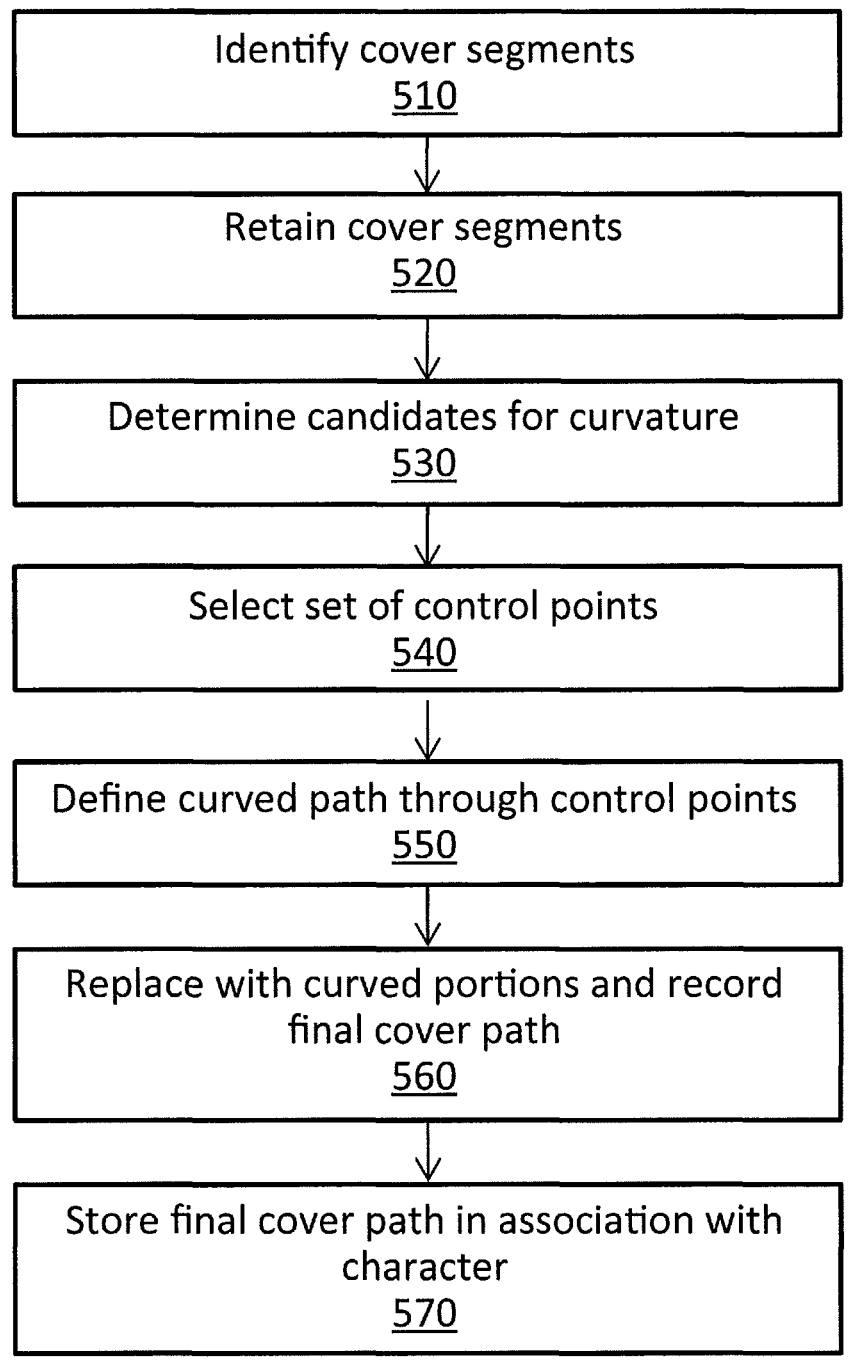
FIG. 5 is a flowchart showing steps in a cover path computation sub-process forming part of the game program executed by the game apparatus, according to a non-limiting embodiment.

Accordingly, with reference to FIG. 5, shown are steps 510-570 of a cover path computation sub-process 500 according to a non-limiting embodiment. The cover path computation sub-process 500 may be executed on a per-character basis and may be triggered in various ways. For example, the cover path computation sub-process 500 may be invoked so as to autonomously compute the cover path continuously in anticipation of the character entering cover mode. Alternatively, the cover path computation sub-process 500 may be invoked only in response to a command from the game program 33, which may occur as a result of the game program 33 determining that the character is to enter cover mode, or by way of an update in response to an object moving within the game environment and therefore potentially altering the previously computed cover path for the character of interest. It should be noted that the character for which the cover path is being computed may be the main (playing) character or a non-playing character (NPC). That is to say, the main character and the NPCs may each be capable of entering cover mode, and embodiments of the present invention are applicable to both scenarios.

As part of executing step 510 of the cover path computation sub-process 500, the processor 10 identifies cover segments that pertain to the character, namely linear segments of nearby objects within the camera view that the character may use for taking cover. A cover segment relates to an area in the vicinity of such an object where the character may be protected from certain enemies or hostile events. The cover segments for various objects may be pre-authored within the game editor, may include hooks or markers for this purpose and may form part of metadata of the game environment. A cover segment could include a segment of a static object or a segment of a dynamic object in the game environment. Examples of static objects may include walls, fences and buildings, to name a few non-limiting possibilities. For such objects, which tend not to change positions within the game environment, the cover segments can be line segments that are defined at static positions in the level of the game environment. On the other hand, examples of dynamic objects may include vehicles, furniture, boxes, etc. For such objects, the cover segments are included with the object data 42 associated with those objects, and may be instantiated multiple times within the game environment. For example, if a dynamic object moves or is moved (e.g., due to physics or gameplay), the cover segment(s) for that object move as well.

In an embodiment, as part of executing step 510 of the cover path computation sub-process 500, the processor 10 may consult the memory 11 to (a) determine one or more objects in a vicinity of the character of interest and (b) identify the cover segments associated with those objects. To this end, and as shown in FIG. 9, the memory 11 may store an association between characters and zero or more objects in the vicinity of the respective character, and as shown in FIG. 10, the memory 11 may store an association between objects and zero or more cover segment(s) per object.

If an object has a height, then the associated cover segment may be projected onto the ground, however a cover segment can follow the slope of the terrain or floor. Cover segments could be associated to the boundaries of a navigation mesh but do not need to be interconnected to form a closed surface. An oddly shaped object may be associated with multiple connected straight-line cover segments that change directions to approximate the shape of the object.

It should be appreciated that there may be multiple cover segments corresponding to the objects that are visible to the camera, yet only certain ones of those are identified by the cover path computation sub-process 500 at step 510. Specifically, the decision regarding which cover segments are identified at step 510 rests with either the game program's artificial intelligence or a set of gameplay rules to anticipate the player's intention based on criteria such as distance, alignment, a path clear of obstacles and so on.

Figure 7A:
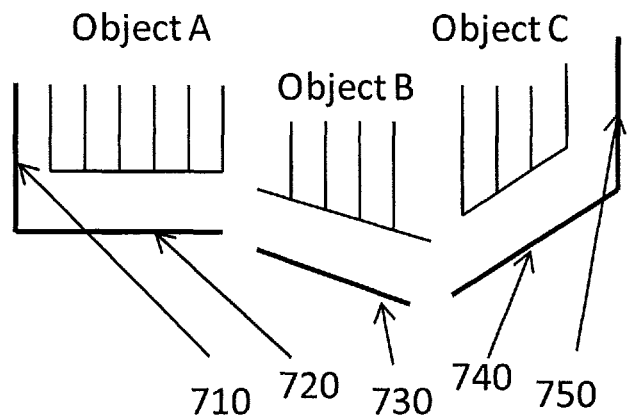
FIGS. 7A-7C diagrammatically illustrate transformation of cover segments into a curved cover path, according to a non-limiting embodiment of the cover path computation sub-process.

In an embodiment, as part of executing step 520 of the cover path computation sub-process 500, the processor 10 retains certain ones of the various cover segments identified at step 510 as forming a "jagged cover path" for the character in question. Adjacent cover segments may belong to the same object or to different objects in the game environment. When they belong to different objects, it is possible for cover segments that are not connected to nevertheless be considered adjacent. For example, when plural objects that are in the vicinity of one another have cover segments whose closest ends are within a certain threshold distance from one another, then these cover segments, though not connected, may be considered as "adjacent cover segments" of the jagged cover path. The threshold distance may be, e.g., 15 cm, 1 m, etc., depending on the scale of the game world; and it is also to be noted that in some embodiments the threshold distance may be measured in pixels (e.g., 50 pixels, 20 pixels, 5 pixels, etc.). At this stage, therefore, the jagged cover path may be represented as a concatenation of adjacent cover segments, which may in some cases be a loose/disjointed concatenation. For example, FIG. 7A shows a plurality of cover segments 710-750 forming a jagged cover path by virtue of step 520. In this non-limiting example, cover segments 710 and 720 are associated with Object A, cover segment 730 is associated with Object B and cover segments 740 and 750 are associated with Object C.

It should be noted that the cover path computation sub-process 500 may consider multiple adjacent cover segments as a single linear segment, as long as the segments can be considered linear extensions of one another. For example, adjacent cover segments that are substantially collinear (e.g., the segments, when extended, meet at no greater than a threshold angle if their extensions do intersect or, if they are parallel, the minimum distance between the segments is no greater than a threshold distance) and whose extremities are close in distance (e.g., within a certain threshold distance) may be considered parts of a single extended cover segment. Also, a change of slope in the vertical direction does not separate a cover segment in two, as long as the projections onto the ground of the two sloped areas are linear extensions of one another (for example, cover segments associated with a wall and an adjacent straight staircase or escalator along the same navigation mesh can be considered part of a single, common cover segment).

In an embodiment, as part of executing step 530 of the cover path computation sub-process 500, the processor 10 analyzes the (potentially disjointed) concatenation of segments joined at step 520 to form the jagged cover path, and attempts to determine portions of the jagged cover path that are candidates to be curved. For example, a criterion for two adjacent cover segments of the jagged cover path to be considered candidates for curvature may be that they are sufficiently aligned, e.g., they form an angle of less than 45 degrees, or less than 30 degrees or even less than 10 degrees or 5 degrees, for example. Conversely, adjacent cover segments of the jagged cover path that meet (or, if extended, would meet) at a greater angle than a threshold angle will not be converted to curved portions, as from their great meeting angle it can be inferred that there is an absence of a curve in the illustrated image. These are only several possible ways of selecting candidates for curvature that will occur to persons skilled in the art in view of the present teachings.

Figure 7B:
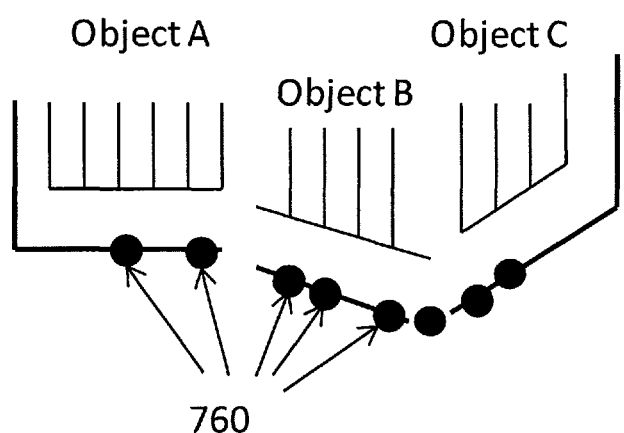

In an embodiment, as part of executing step 540 of the cover path computation sub-process 500, the processor 10 may select a set of control points along the portion(s) of the jagged cover path determined at step 530. In a non-limiting embodiment, four control points may be used for each cover segment that is to be transformed into a curved portion. In another non-limiting embodiment, a certain number of control points may be used for each cover segment that is to be curved and that is adjacent to another cover segment that is to be curved, and a different (e.g., smaller) number of control points may be used for cover segments that are to be curved but that are adjacent to a cover segment that is not to be curved. The position of the control points along the cover segments may be calculated according to the neighboring cover segments to assure continuity between adjacent cover segments, using the positions and the tangents at the position where the cover segments are at the closest. In other embodiments, the control points for a cover segment need not be on the cover segment itself but may be slightly offset from it. In some embodiments, rather than coinciding with a cover segment, the control points may be located in a gap between two adjacent cover segments that are to be curved. With reference to FIG. 7B, control points 760 are shown on each of segments 720, 730 and 740 of the jagged cover path that are to be curved, with the exception of one control point located in the gap between segments 730 and 740.

It should be appreciated that the term "curved" when referring to a portion of the cover path may mean that if the portion were made continuous and plotted against one or more variables, the first derivative would be a non-constant continuous function. Alternatively, it may mean that the portion is smoother (e.g., has less local variance in its first derivative) than a plot unifying the group of underlying cover segments from which it was derived.

Figure 7C:
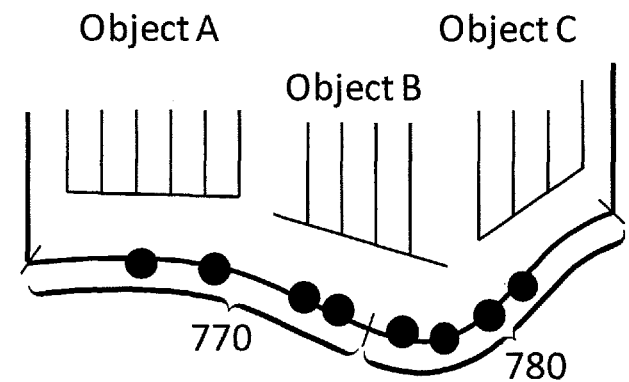

In an embodiment, as part of executing step 550 of the cover path computation sub-process 500, the processor 10 creates a smooth, curved surface in 2-D or 3-D space that passes through the control points 760 selected at step 540. To this end, one or more splines may be computed. In order to compute a spline, one option is to apply the centripetal Catmull-Rom algorithm, as described (see, for example, P. J. Barry and R. N. Goldman: A recursive evaluation algorithm for a class of Catmull-Rom splines. SIGGRAPH Computer Graphics, 22(4):199-204, 1988, hereby incorporated by reference herein). This type of spline may have certain advantages, for example it may be constrained to pass through each of its control points while maintaining continuity and preventing any loops in the curve. To generate a smooth Catmull-Rom spline across adjacent segments, one may consider the two left-most control points of the segment to the right and the two right-most control points of the segment to the left. This is illustrated in FIG. 7C, where spline 770 is computed from two control points of segment 720 and two control points of segment 730. Also, spline 780 is computed from two control points of segment 730 and two control points of segment 740. To this end, it is noted that segment 730 has four control points used in two different splines, and the region between the two middlemost control points may remain a straight-line segment. The spline, of which there may be more than one concatenated together, may be a Catmull-Rom spline, but this is not a requirement. Other techniques for the creation of a spline or other curved path may be used without departing from the scope of the present invention. For example, a different number of control points may be used, and different types of splines may also be used, such as Hermite curves and spherical blend.

In an embodiment, as part of executing step 560 of the cover path computation sub-process 500, the processor 10 replaces the portion(s) of the jagged cover path determined at step 530 with the corresponding curved portion(s) determined at step 550, thereby creating the final cover path for the character. The final cover path may include curved and non-curved portions. In the example of FIG. 7C, it is seen that the final curved cover path includes one or more curved portions (e.g., spline 770, or a portion thereof) where originally there were cover segments that had been aligned to within a threshold angle, and where adjacent cover segments that meet at a greater angle were not forced into a curve. The final cover path is the path along which movement of the character is constrained when the character is in cover mode, and may be used by other aspects of the game program 33. FIG. 11 shows an extension of FIG. 8, illustrating an example of an association held in the memory 11 between each character and the corresponding final cover path.

In an embodiment, as part of executing step 570 of the cover path computation sub-process 500, the processor 10 stores the final cover path for the character in the memory 11. This may be done by storing the parameters (e.g., polynomial coefficients) of the final cover path or its actual positional values in 3-D space, depending on memory, accuracy and processing requirements. It is noted that a cover path may be calculated for a character even though the character may not presently be in cover mode. The final cover path may also be repeatedly recalculated, based on movement of the character and/or of the objects in the character's vicinity.

It should be appreciated that the character may travel at a speed relative to the underlying linear segment that was used to define the curved cover path. The ratio along the linear segment is then predicted on the curved cover path, using the centripetal Catmull-Rom algorithm.

Figure 12:
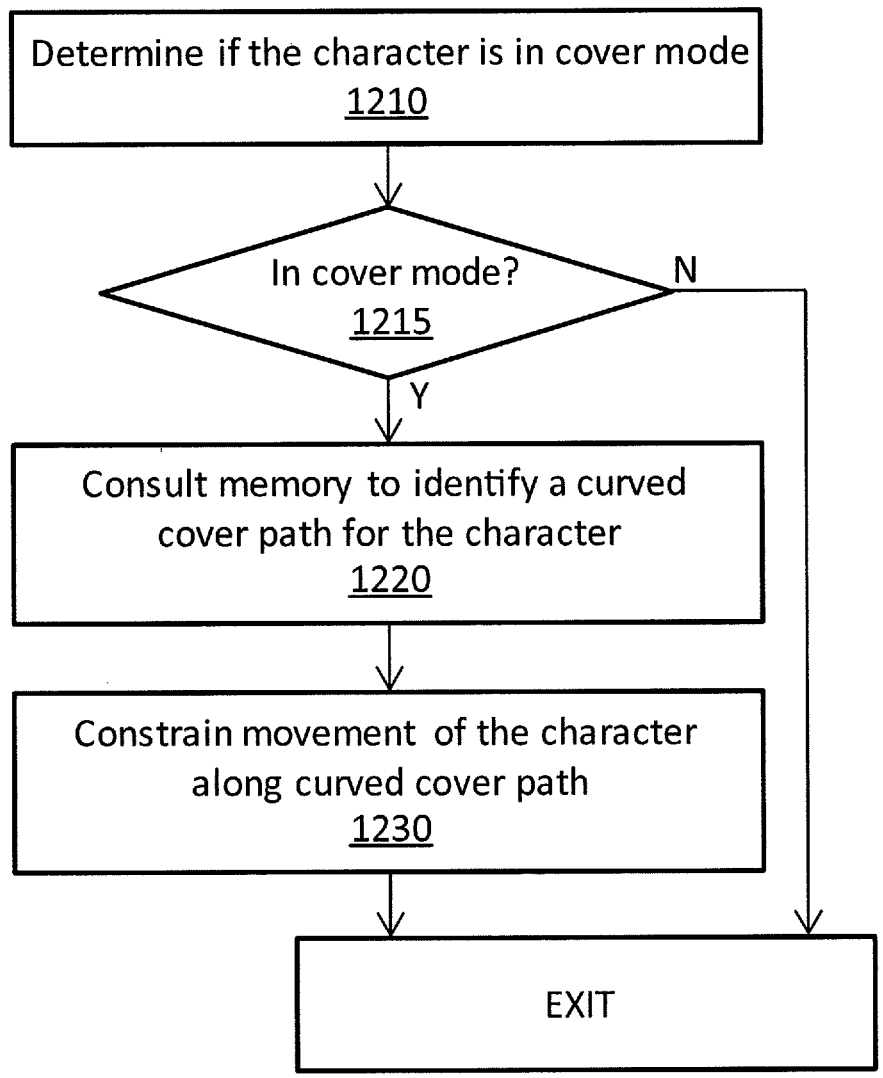
FIG. 12 is a flowchart showing steps in a method for constraining movement of a character along a curved cover path, according to a non-limiting embodiment.

Thus, with reference to FIG. 12, it will be appreciated that, further to the above description, embodiments of the present invention may include a process or method 1200 for controlling movement of a playing or non-playing character within the game world as instantiated by the processor 10. The process or method involves determining whether the character is in cover mode (step 1210); responsive to determining that the character is in cover mode (step 1215), consulting the computer-readable memory 11 to identify a curved cover path for the character (step 1220); and constraining movement of the character along a curved cover path (step 1230). This is performed while the character is in cover mode, otherwise this process may exit and control of the character's movement returns to normal where it is not constrained to the curved cover path.

Figure 13:
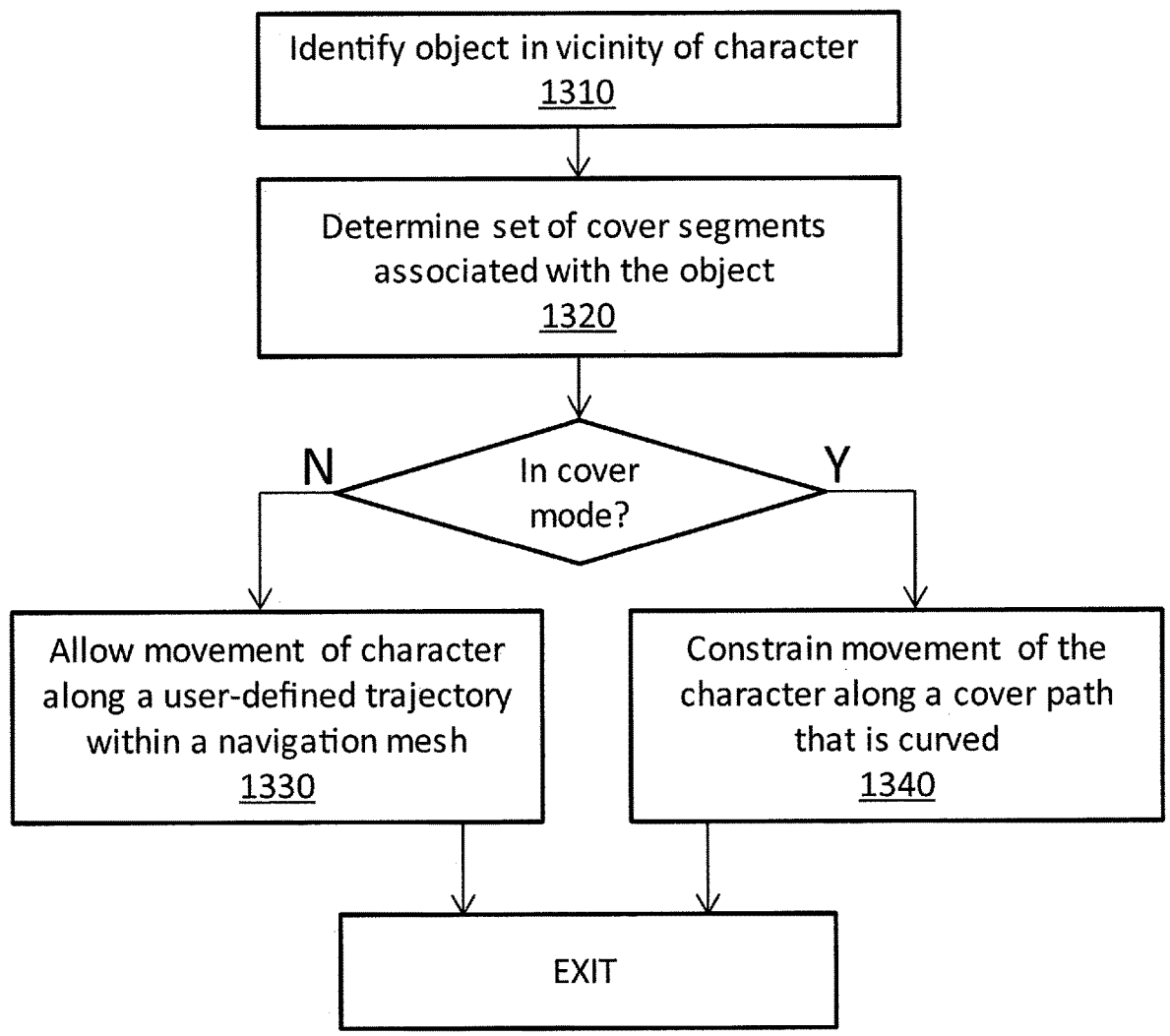
FIG. 13 is a flowchart showing steps in a method for controlling movement of a character, depending on whether the character is in cover mode or not in cover mode, according to a non-limiting embodiment.

With reference to FIG. 13, it will also be appreciated that, further to the above description, embodiments of the present invention may include a process or method 1300 for controlling movement of a playing or non-playing character within the game world as instantiated by the processor 10. The process or method involves identifying an object in a vicinity of the character (step 1310); determining a set of cover segments associated with the object (step 1320); allowing the character to travel along a user-defined trajectory within a navigation mesh when the character is not in cover mode (step 1330); and constraining the character's motion to a cover path when the character is in cover mode and in a vicinity of the object, the cover segments being linear and the cover path being curved (step 1340).

It should be appreciated that certain adaptations and modifications of the described embodiments can be made. Therefore, the above discussed embodiments are to be considered illustrative and not restrictive. Also, it should be appreciated that additional elements that may be needed for operation of certain embodiments of the present invention have not been described or illustrated as they are assumed to be within the purview of the person of ordinary skill in the art. Moreover, any feature of any embodiment discussed herein may be combined with any feature of any other embodiment discussed herein in some examples of implementation. Moreover, certain embodiments of the present invention may be free of, may lack and/or may function without any element that is not specifically disclosed herein.

The invention claimed is:

1. A computer system, comprising:
a memory storing data and program instructions, the data representing a game environment including a character and a plurality of cover segments;
a player interface; and
a processor configured to execute the program instructions stored in the memory, wherein execution of the program instructions causes the computer to implement a method that comprises:
determining a selected subset of the cover segments;
subsequent to the determining, determining a curved cover path that passes through control points associated with the selected subset of the cover segments; and
rendering images for display via the player interface, the images showing movement of the character along the determined curved cover path while the character is in cover mode.

2. The computer system defined in claim 1, wherein the method implemented by the computer further comprises storing the curved cover path in memory in association with the character.

3. The computer system defined in claim 1, wherein the method implemented by the computer further comprises selecting at least some of the control points to lie on one or more of the cover segments in the selected subset.

4. The computer system defined in claim 1, wherein the method implemented by the computer further comprises selecting at least some of the control points to lie in a gap between adjacent cover segments in the selected subset.

5. The computer system defined in claim 1, wherein determining a curved cover path that passes through a set of control points comprises determining parameters of a centripetal Catmull-Rom spline that passes through the control points.

6. The computer system defined in claim 5, wherein the control points span at least two adjacent cover segments in the selected subset.

7. The computer system defined in claim 1, the data further associating the character with a capability of being in a cover mode, wherein the character is moved along the curved cover path in the game environment in response to commands to move the character received via the player interface while the character is in cover mode.

8. The computer system defined in claim 7, wherein the method further comprises storing in memory the curved cover path in association with the character being in cover mode.

9. The computer system defined in claim 8, wherein the processor carries out the storing autonomously.

10. The computer system defined in claim 8, wherein the processor carries out the storing in response to detecting a user command for the character to enter cover mode.

11. The computer system defined in claim 8, wherein the processor carries out the detecting and storing in response to detecting game conditions for the character to enter cover mode.

12. The computer system defined in claim 7, each cover segment associated with an object in the game environment and indicative of an area in a vicinity of the object where the character is eligible to take cover from hostilities in the game environment.

13. The computer system defined in claim 12, whether the object is a static object in the game environment.

14. The computer system defined in claim 12, whether the object is a dynamic object in the game environment.

15. The computer system defined in claim 7, further comprising storing a parametric definition of the curved cover path in the memory in association with the character being in cover mode.

16. The computer system defined in claim 1, wherein to determine the selected subset of the cover segments, the processor is configured to identify at least one object in a vicinity of the character within the game environment and a plurality of linear segments associated with the at least one object, from which the selected subset of the cover segments is determined.

17. The computer system defined in claim 1, wherein the cover segments in the selected subset include cover segments associated with one or more objects in proximity to the character within the game environment.

18. The computer system defined in claim 17, wherein at least one of the objects is a static object in the game environment.

19. The computer system defined in claim 18, wherein at least one of the objects is a dynamic object in the game environment.

20. The computer system defined in claim 1, wherein determining the selected subset of the cover segments comprises determining those of the cover segments that have ends that are proximate to within a threshold distance in the game world.

21. The computer system defined in claim 20, wherein the threshold distance is no greater than 1 meter and wherein the threshold angle is no greater than 45 degrees.

22. The computer system defined in claim 1, wherein determining the selected subset of the cover segments comprises determining those of the cover segments that have ends that are separated by no more than a threshold number of pixels.

23. The computer system defined in claim 1, wherein determining the selected subset of the cover segments comprises determining those of the cover segments that, upon extension, meet an angle no greater than a threshold angle.

24. A method for controlling movement of a character within a game environment instantiated by a game program executed by a processing device of a game apparatus, the game environment including objects and cover segments associated with the objects, comprising the processing device:
   determining a selected subset of the cover segments;
   subsequent to the determining, determining a curved cover path that passes through control points associated with the selected subset of the cover segments; and
   rendering images for display via the player interface, the images showing movement of the character along the determined curved cover path while the character is in cover mode.

25. A non-transitory computer-readable medium comprising computer-readable instructions which, when executed by a processor of a game apparatus, cause the game apparatus to implement a method for controlling movement of a character within a game environment, the game environment including objects and cover segments associated with the objects, the method comprising
   determining a selected subset of the cover segments;
   subsequent to the determining, determining a curved cover path that passes through control points associated with the selected subset of the cover segments; and
   rendering images for display via the player interface, the images showing movement of the character along the determined curved cover path while the character is in cover mode.

26. A method for controlling movement of a character within a game environment instantiated by a game program executed by a processing device of a game apparatus, comprising the processing device:
   determining that the character is in cover mode;
   responsive to determining that the character is in cover mode, consulting a memory to identify a curved cover path for the character, the cover path including at least one curved portion; and
   constraining movement of the character along the curved cover path while the character is in cover mode.

27. The method defined in claim 26, further comprising placing the character in cover mode in response to receiving a command from a user of the game apparatus.

28. The method defined in claim 27, wherein the character is a playing character.

29. The method defined in claim 26, further comprising placing the character in cover mode in response to receiving a command from the game program.

30. The method defined in claim 29, wherein the character is a non-playing character.

31. The method defined in claim 26, wherein the curved cover path is in 2-D space.

32. The method defined in claim 26, wherein the curved cover path is in 3-D space.

33. A non-transitory computer-readable medium comprising computer-readable instructions which, when executed by a processor of a game apparatus, cause the game apparatus to implement a method for controlling movement of a character within a game environment, the method comprising
   determining that the character is in cover mode;
   responsive to determining that the character is in cover mode, consulting a memory to identify a curved cover path for the character, the curved cover path including at least one curved portion; and
   constraining movement of the character along the curved cover path while the character is in cover mode.

34. A computer system, comprising:
   a memory storing data and program instructions, the data representing a game environment including a character;
   a player interface; and
   a processor configured to execute the program instructions stored in the memory, wherein execution of the program instructions causes the computer to implement a method that comprises:
   determining that the character is in cover mode;
   responsive to determining that the character is in cover mode, consulting a memory to identify a cover path for the character, the curved cover path including at least one curved portion; and
   constraining movement of the character along the curved cover path while the character is in cover mode.

35. A method for controlling movement of a character within a game environment instantiated by a game program executed by a processing device of a game apparatus, comprising the processing device:
   identifying an object in a vicinity of the character;
   determining a set of cover segments associated with the object;
   allowing the character to travel along a user-defined trajectory within a navigation mesh when the character is not in cover mode; and
   constraining the character's motion to a cover path when the character is in cover mode and in a vicinity of the object, the cover segments being linear and the cover path being curved.

36. The method defined in claim 35, wherein to determine the set of cover segments associated with the objects, the processing device is configured for determining hooks or markers in the game program associated with the object.

\* \* \* \* \*